(12) United States Patent
Rivero

(10) Patent No.: US 12,289,031 B1
(45) Date of Patent: Apr. 29, 2025

(54) TORQUE GENERATOR FOR SCALING UP EFFICIENCY

(71) Applicant: Orlando Jose Rivero, Hoboken, NJ (US)

(72) Inventor: Orlando Jose Rivero, Hoboken, NJ (US)

(*) Notice: Subject to any disclaimer, the term of this patent is extended or adjusted under 35 U.S.C. 154(b) by 0 days.

(21) Appl. No.: 17/664,410

(22) Filed: May 21, 2022

(51) Int. Cl.
*H02K 53/00* (2006.01)
*H02K 21/12* (2006.01)
*H02K 21/24* (2006.01)

(52) U.S. Cl.
CPC ............ *H02K 53/00* (2013.01); *H02K 21/12* (2013.01); *H02K 21/24* (2013.01)

(58) Field of Classification Search
CPC ......... H02K 53/00; H02K 21/24; H02K 21/12
See application file for complete search history.

(56) References Cited

U.S. PATENT DOCUMENTS

| | | | |
|---|---|---|---|
| 2009/0066172 A1* | 3/2009 | Landon, Jr. ............ | H02K 53/00 310/46 |
| 2019/0207504 A1* | 7/2019 | Hsu ......................... | H02K 53/00 |
| 2024/0030840 A1* | 1/2024 | Sakuma ................... | H02P 3/20 |

* cited by examiner

*Primary Examiner* — Michael C Zarroli

(57) ABSTRACT

A single asymmetric magnetic stator force field is used to help breach into the next magnetic potential on a rotor disc as well as contain the extra momentum as the motor progresses faster than it normally would without it, up until an intended terminal velocity is reached. The latter side of the asymmetric stator's permanent magnet net force pinpoint position is significantly stronger than the preceding side, thereby creating a forward bias which can be used to heighten a rotor disc's speed or overall angular force for the purpose of energy harvesting and use.

1 Claim, 7 Drawing Sheets

Overlapping Fields

TORQUE GENERATOR FOR SCALING UP EFFICIENCY

FIELD OF THE INVENTION

The fields in which this invention incorporates itself are the fields of electric motors, torque generation, and renewable energy generation.

BACKGROUND OF THE INVENTION

Although there were many attempts outside of convention and within other patent applications to create a device wherein permanent magnets, themselves, can be used to directly generate power, apart from also acting as the driving forces within the motors as well as being used in spinning turbines for the generation of electric current through induction coils by means of their motion, no motor has ever been successfully built to use permanent magnets as a direct source of useable power, until now. Now such a concept can have a practical use in the real world.

BRIEF SUMMARY OF THE INVENTION

As a battery powers the Electronic Speed Controller (ESC) of a 3-phase brushless motor, acting as the initial power source, the Electronic Speed Controller (ESC) uses its settings it bears to power the motor at the predetermined speed.

The motor's rotor has four strong, permanent neodymium magnets fixed at 90 degrees from one another with respect to the rotor's center and with all like-poles facing the outer direction at the edge of the rotor. These magnets each encounter an asymmetric magnetic stator, and the stator is angled between 90 and 45 degrees from the horizontal axis, wherein the strongest asymmetry is found just above the 45 degree point.

The four like-poles of the rotor magnets first encounter another like-pole located at the beginning of the stator, and then eventually they would surpass the opposite magnetic pole at the end of the stator due to the combination of the two forward-facing repulsive and attractive forces of the poles whilst a rotor magnet is within the length of the stator. However, this angular configuration trigonometrically creates a region of magnetic, forward-biased asymmetry at the center of mass of the stator for the rotor magnets to interact with. At this central region of the stator is the action point of the overbearing forward forces, because with respect to the affixed horizontal track magnets of the spinning rotor, there are two forward-biased, planar force vectors emanating from the two focal points and are present only within the stator's mass and are thus absent on the side preceding the stator. Now their overall planar net force vectors overcome the merely linear counterforces of the poles.

The vertical aspects of the two aforementioned planar force vectors while at the stator angles stated above are stronger than that of their horizontal aspects, but they are ultimately neglected because of the horizontal affixation of the rotor and its magnets. This angle range limits the symmetric focal points of the north and south poles to the vertical quadrants of an otherwise horizontally affixed rotor track, leaving the remaining horizontal aspects of the two planar vectors partially isolated from the rest of the magnetic stator's force vectors.

And as a result, a great majority of the total influential magnetism is pointed in the forward direction, and entering and passing the stator from this side takes less force than doing so for the latter side towards the opposite direction, and an asymmetry is created which overcomes the net counterforces and produces an extra thrust seamlessly exiting well beyond the stator. This allows for the phenomenon wherein the base revolution speed of the magnetic motor, whilst encountering the asymmetric magnetic stator, increases the rotor's overall speed or angular force at the set RPM, generating an extra torque, thereby giving rise to a device which can directly scale-up the efficiency of the motor and its power output up to a standardized amount by design, creating a means for portable power source generation and energy harvesting which yields zero emissions and is quieter than conventional gas-powered generators.

DETAILED DESCRIPTION OF THE PREFERRED EMBODIMENTS

Figure 1:
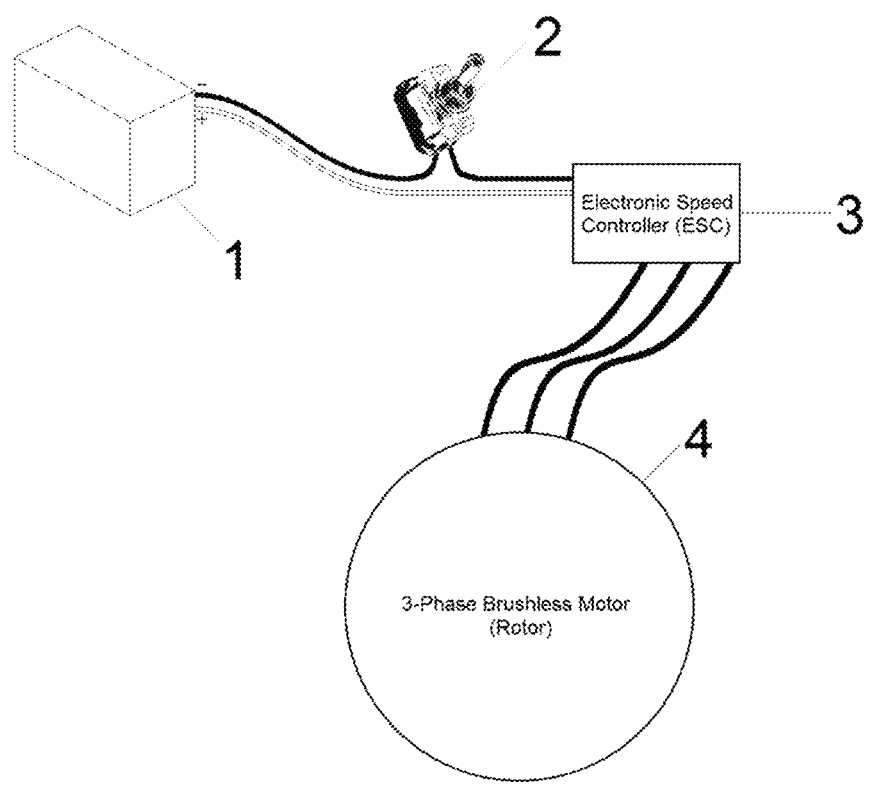
FIG. 1 depicts the power supply setup of the generator.
Figure 2:
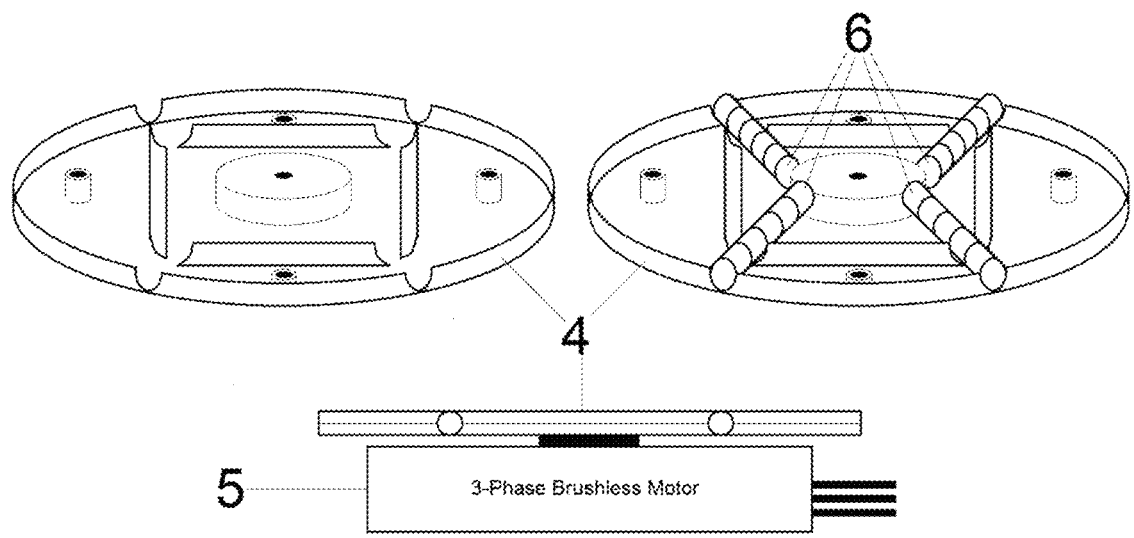
FIG. 2 shows the containment and affixation of the rotor magnets from an angled upper view and a side view.

As shown in FIG. 1 and FIG. 2, a rechargeable battery 1 is joined together with the Electronic Speed Controller (ESC) 3 of a 3-phase brushless motor 5 by a power switch 2. The Electronic Speed Controller (ESC) 3 digitally attunes its power output and cycle frequency based on the current speed of the 3-phase brushless motor 5, up until the 3-phase brushless motor 5 reaches the maximum speed.

Mounted onto the rotor 4 of the 3-phase brushless motor 5 are a set of 4 strong permanent neodymium rotor magnets 6 which are used as the means by which induction coils will ultimately induce a current by virtue of their motion while the rotor 4 is spinning. The rotor magnets 6 are also incorporated as a main propulsive force of the power generator, which use their magnetism as the means by which the overall efficiency of the power output of the motor is scaled-up to a predetermined maximum efficiency as they also interact with an asymmetric magnetic stator 13. The rotor magnets 6 are mounted at 90 degrees from one another with respect to the rotor's 4 center and with all like-poles facing the outer direction at the edge of the rotor 4.

Figure 3:
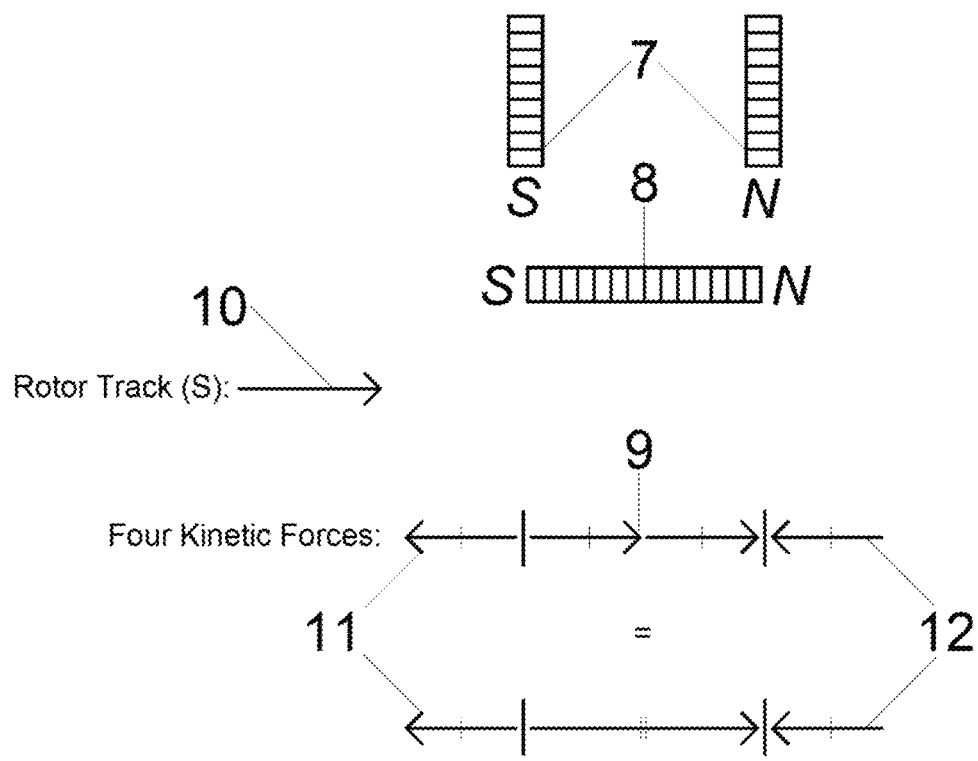
FIG. 3 gives an overhead representation of a basic and linear magnetic track principle which is ultimately facilitated into the new effect brought about by the invention.

The asymmetric magnetic stator 13 is also a strong permanent neodymium magnet and is angularly configured to yield a forward-biased magnetic propulsion onto the rotor magnets 6. Firstly, a magnetic mechanism is integrated into the focal point of the asymmetric magnetic stator 13 and is a basic principle of kinetic net forces arising from magnets acting on an affixed rotor track 10, named the "repulsion-attraction-expulsion principle", which is illustrated in FIG. 3. FIG. 3 shows that when two opposite magnetic poles are placed in parallel with a magnetic rotor track 10 and with a notable spacing in between them, then there are four equal and independently acting kinetic force vectors present as a result, with their strongest points emanating from each of the two magnetic focal points of the stator. Given that the rotor magnet's 6 pole is the same pole as the one first encountered on the magnetic stator during forward motion, either a set of two perpendicular magnets 7, or a single parallel magnet 8, can be used to create a stator in which the magnetic fluxes in between them 9 forcibly expel a rotor magnet 6 outside of the magnetic influence of said stator, with no pullback from the opposing counterforce 12 at the end. This effect is the result of the alignment of the directions of the two inner forward force vectors 9 in which they always contain an overbearing force on the final attractive counterforce 12 so long as the initial counterforce 11 is breached into, from which directly afterwards the rotor magnet 6 always escapes the magnetism of the stator entirely and with some extra momentum.

This effect, however, is symmetrical because there are no trigonometric qualities in these linear positions. Therefore, the total net counterforce is always equal to any subsequent forward propelling magnetic forces which eventually lead through the expulsion point of the magnetic stator.

Figure 4:
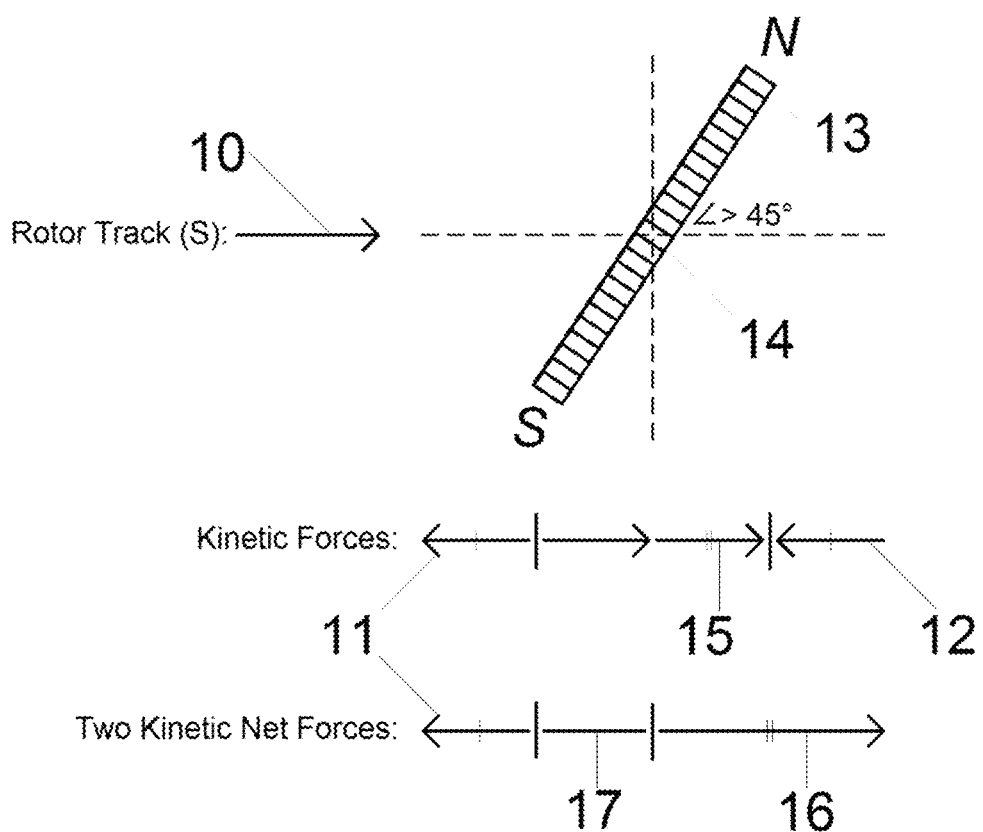
FIG. 4 shows how the asymmetric magnetic stator can contain said magnetic track principle while also showing the forward forces of the principle containing greater degrees of magnitude.

Therefore, the asymmetric magnetic field is created by partially isolating the two inner forward force vectors 9 from the two outer counterforce vectors which arise from the two opposite poles of a magnetic stator, as shown in FIG. 4 (frontal view). The asymmetric magnetic stator 13 is placed in an acute, angular position from the horizontal axis of which the two inner forward force vectors 9 still have a significant longitudinal property arising from the high strength of the neodymium magnets used, all while incorporating a latitudinal distancing and diminishing of their otherwise independently self-cancelling (symmetrical) focal points.

Figure 5:
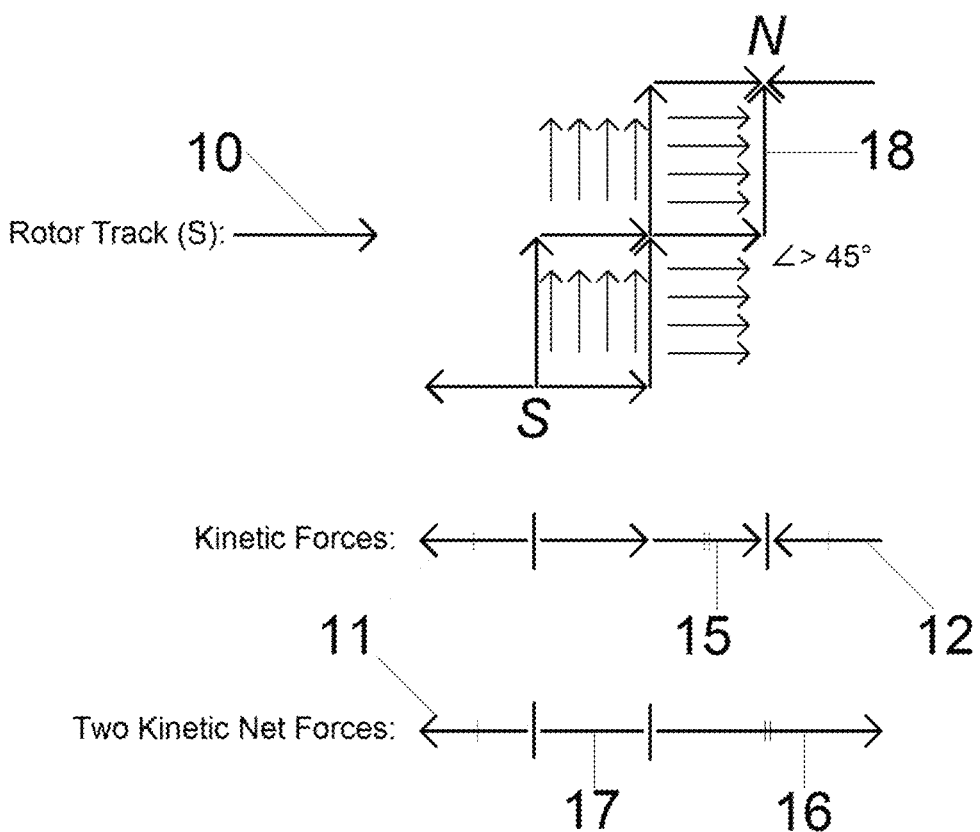
FIG. 5 is a representation of the trigonometric properties and the resulting asymmetry of a magnetic stator configured with such conditions, and the two planar force vectors arising from the stator's two focal points. The vertical planar aspects have no influence in horizontal motion of the rotor, thereby partially isolating the forward horizontal planar aspects of the principle to only encounter the linear counterforces, creating asymmetry as a result.

To get a forward propulsion bias, and given that the rotor magnets 6 have their south-poles facing the outer edge of the rotor 4, the "repulsion-attraction-expulsion principle" is firstly incorporated into an angle as follows:

1—North (attractive) is up and forwards
2—South (repelling) is down and backwards To create the magnetic asymmetry, the distanced poles of the magnetic stator are placed at an angle that is more than 45 degrees, but less than 90 degrees, from the horizontal axis, with the strongest asymmetric effect near the 45 degree point while within such a range. FIG. 5 shows how the two inner forward force vectors 9 now become two planar force vectors 18 which contain vertical and horizontal properties due to the stator being angled. So long as the stator is angled above 45 degrees but less than 90 degrees, then the vertical aspects throughout the asymmetric magnet stator's two planar force vectors 18 are always stronger than that of the horizontal aspects, yet the vertical aspects become negligible due to the horizontal affixation of the rotor track 10 despite their higher strengths. This is intentional because if, by contrast, the horizontal aspects of the two planar vectors 18 are stronger than the vertical aspects (e.g., the stator is angled below 45 degrees), then the stator's magnetic forces become symmetrical again because their focal points are within the horizontal quadrants of the rotor track 10. Therefore, it is crucial to remain above 45 degrees when mounting the magnetic stator. Furthermore, these two planar force vectors 18 and their partially isolated forward forces 15 only appear after entering the stator and are thusly absent on the side which precedes the breaching counterforce 11 of the stator. The result is a stator which contains counterforces as if they are from a weaker magnet and forward forces 15 as if they are from a stronger magnet, yet there is only one magnet being used as a stator.

As shown in FIG. 4, the asymmetrical action point 14 is at the center of mass of the magnetic stator 13, i.e., where the two planar vectors 18 meet, and it takes less force to enter this forward-propelling point from one direction than it does to exit said forward-propelling point when coming from the opposite direction. Between the points of the asymmetrical action point 14 at the center of mass of the asymmetric magnetic stator 13 and the magnetic stator's lower, repelling pole, when referring to the rotor track 10, there is a neutral zone 17 wherein the rotor magnet 6 will either give no motion or remain at the same speed throughout this region due to the magnetic cancellation that is present there. It is at this neutral zone 17 where the strongest vertical aspects of the two planar force vectors 18 are, and therefore, there is no motion given to the magnetic rotor 4 due to the magnetic rotor's 4 horizontal affixation. The subsequent asymmetrical action point 14 after this neutral zone 17, however, has a great majority of the total influential magnetism pointed at the forward direction. It is here where the rotor magnets 6 escape the asymmetric magnetic stator 13 entirely with some extra momentum after the expulsion.

Figure 6:
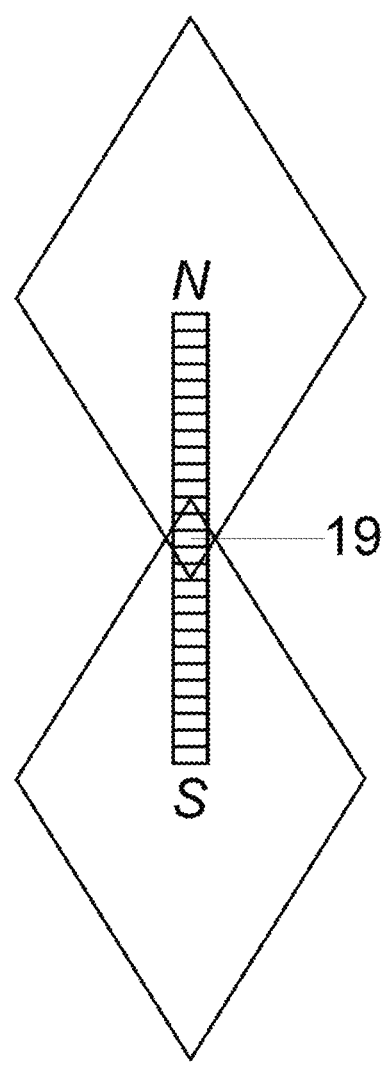
FIG. 6 regards the length in which magnetic stators should have with respect to the partial superimposition of their two magnetic fields, which arise from the size and the strength of the magnets.

While referring to the overall size of the magnets on the stator, the longer a magnet is, then the more separated the field fluxes are, and so a certain stator size is determined depending on the diameter and strength of the neodymium magnets used for the generator. FIG. 6 shows the two magnetic fields of a magnet which has the length sought after in order to be used for an asymmetrical region of magnetism. The resulting asymmetrical magnetic stator 13 size should ultimately have partially superimposing magnetic fields 19 to create asymmetry. Whilst determining the length of a magnetic stator, the field sizes of the poles are detected by using the like-poles of another magnet. By contrast, either pole of another magnet will be attracted to the ferrous metal in the middle of a longer magnet wherein the magnetic fields are too distanced from one another and there are minimal magnetic field fluxes as a result.

Subtracting a comparatively smaller counterforce 11 from a bigger forward force 15 in order to use the latter to harness energy can only happen when there's a continuous and constant motion used as a base revolution speed, so long as the base revolution speed has enough force to breach into the magnetic stator, thereby consuming the smaller counterforce 11. The set speed will then ultimately yield either a higher RPM or angular force after also consuming the bigger forward force. This gives rise to varying degrees of voltages that can be generated from an initial voltage. Creating a torque generator is therefore possible by use of an electrical current as the means by which a base revolution speed is facilitated.

As a structural note, the rotor magnets 6 should ultimately have solid, nonmagnetic, metallic mounting brackets near the center of the disc, securely fixed by parts such as nuts and bolts, epoxy glue and/or screws and encased. Otherwise, the centrifugal force will tend to launch the magnets outwards. The structural mounting at the center and encasing of the rotor magnets 6 will allow for the covalent electron bonds of the disc to both mediate the torque and not be overpowered by the angular momentum, in lieu of merely using adhesive tape or glue of which their bonding forces will theoretically not always remain above the generated torque.

WARNING: NEVER use the device while sitting in front of or facing it, to avoid risk of objects being thrown at high speeds.

Figure 7:
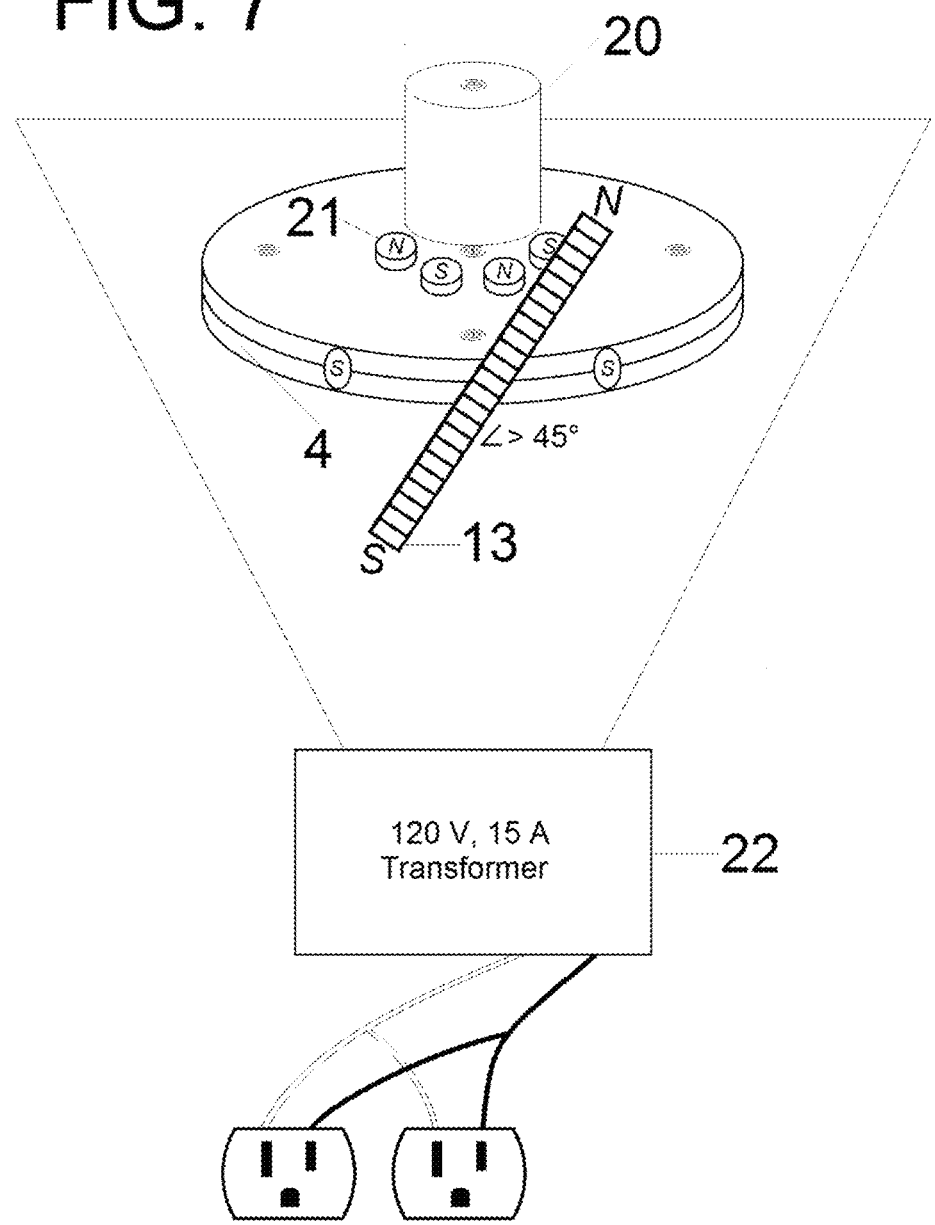
FIG. 7 depicts how an overhanging set of coil stators in a container above the rotor's center and central permanent magnets with alternating poles fixed at the rotor's center can utilize the generated torque with the motion and alternating poles of the central magnets to induce a greater voltage and current than the initial power source yields. The coils then connect to a transformer circuit which yields the standardized 120 Volts and 15 Amps of alternating electrical current, ultimately leading to power outlets through which other devices are powered.

In FIG. 7, it is shown that the addition of both an overhanging set of coil stators in a container 20 above the rotor's center and of central permanent magnets 21 with alternating poles can be used to portably generate power by the means of the voltage inductions on the coils from the central permanent magnets' 21 moving and alternating magnetic fields at the set RPM, given also that the Electronic Speed Controller (ESC) 3 and 3-phase brushless motor 5 is powered by a rechargeable or durable battery. When there is an increase of efficiency due to the asymmetric magnetic stator 13 and rotor magnet 6 configuration, the overhanging coil stators can utilize the presence of the virtual mass constant of the magnetically assisted angular momentum of the rotor's central permanent magnets 21 to generate a voltage source, all while making a negligible change of RPM on the rotor 4 when said voltage source is used, because the magnetically assisted angular momentum's virtual mass constant at the given RPM is greater than that of the mass constant of the angular momentum that would normally be contained without any extra asymmetric magnetism present at said RPM. FIG. 7 also shows how the overhanging set of coil stators in a container 20 ultimately lead to a transformer circuit 22 which is fine-tuned to yield the standardized 120 Volts and 15 Amps of alternating electrical current to power other devices through power outlets.

As adding torque to a spinning rotor 4 will either create a higher angular force or increase the rotor's 4 speed, both of which can be utilized to generate power, the device's total weight will mediate and anchor the generated torque, lest the extra energy generated escapes as vibrational waves into the device's surroundings and the device ceases to accelerate any faster to the intended maximum. Therefore, the result of this invention is a direct relationship between mass (or the total weight of the device) and possible torques reachable by a smaller mass (or the 3-phase brushless motor) thru magnetism for the purpose of creating a renewable source of electrical energy.

What is claimed is:

1. A magnetic motor comprising,
    a rotor with uniformly spaced neodymium permanent magnets emanating from a central radius of the rotor, the rotor typically is configured with 4 to 6 magnets with their south poles facing outwards from the central radius;
    a stator positioned circumferentially around the rotor,
        the stator is a long magnet further positioned between 45° and 90° degrees with respect to the horizontal axis of the rotor for an asymmetrical magnetic field effect;
        the stator is constructed and positioned so that the ends of the spherical magnetic fields of its south and north poles partially superimpose each other and cover the center point of the stator to trigger the magnetic effect, this stator magnetic effect influences and is detected by the repulsive poles of the outside long magnet;
        the stator's magnetic poles interact with the spinning rotor, the first stator magnetic pole that the rotor magnetically interacts with is a repulsive pole, and then the rotor interacts with the attractive pole on the opposite side of the rotor stator configuration.

\* \* \* \* \*